(12) United States Patent
Makowski et al.

(10) Patent No.: US 10,543,802 B1
(45) Date of Patent: Jan. 28, 2020

(54) CENTER CONSOLE RESTRAINT SYSTEM

(71) Applicant: Ford Global Technologies, LLC, Dearborn, MI (US)

(72) Inventors: Matthew B. Makowski, Northville, MI (US); Deepak Patel, Canton, MI (US); Tahmidur Rahman, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 16 days.

(21) Appl. No.: 16/042,589

(22) Filed: Jul. 23, 2018

(51) Int. Cl.
*B60R 21/20* (2011.01)
*B60R 21/233* (2006.01)
*B60R 21/231* (2011.01)

(52) U.S. Cl.
CPC ............ *B60R 21/233* (2013.01); *B60R 21/20* (2013.01); *B60R 21/231* (2013.01); *B60R 2021/23161* (2013.01); *B60R 2021/23324* (2013.01)

(58) Field of Classification Search
CPC ...... B60R 21/2338; B60R 2021/23161; B60R 21/231; B60R 2021/0004; B60R 2021/0044; B60R 2021/23153; B60R 2021/23384; B60R 21/232; B60R 21/233; B60R 2021/0048; B60R 2021/0058; B60R 2021/01231; B60R 2021/23316; B60R 2021/23324; B60R 2021/23382; B60R 2021/23386; B60R 21/01; B60R 21/214; B60R 21/2346; B60R 21/239; B60R 21/20
USPC ......... 280/729, 730.1, 730.2, 736, 740, 741, 280/743.1, 743.2
See application file for complete search history.

(56) References Cited

U.S. PATENT DOCUMENTS

| | | | | | |
|---|---|---|---|---|---|
| 3,843,150 | A | * | 10/1974 | Harada | B60R 21/231 280/729 |
| 4,076,277 | A | * | 2/1978 | Kuwakado | B60R 21/231 280/738 |
| 5,542,695 | A | * | 8/1996 | Hanson | B60R 21/231 280/729 |
| 5,570,900 | A | | 11/1996 | Brown | |
| 6,260,877 | B1 | * | 7/2001 | Rasmussen, Sr. | B60R 21/203 280/729 |
| 6,966,576 | B1 | * | 11/2005 | Greenstein | B60R 21/23138 280/730.1 |
| 8,181,988 | B2 | * | 5/2012 | Adachi | B60R 21/233 280/729 |
| 8,267,424 | B2 | * | 9/2012 | Tomitaka | B60R 21/231 280/730.2 |
| 8,360,469 | B2 | * | 1/2013 | Wiik | B60R 21/23138 280/730.2 |

(Continued)

FOREIGN PATENT DOCUMENTS

| | | | |
|---|---|---|---|
| DE | 10007343 A1 | 8/2001 | |
| DE | 10040075 C1 * | 1/2002 | ............ B60R 21/20 |

(Continued)

*Primary Examiner* — Paul N Dickson
*Assistant Examiner* — Hilary L Johns
(74) *Attorney, Agent, or Firm* — Frank A. MacKenzie; Bejin Bieneman PLC (57) ABSTRACT

A restraint system includes a center console and an airbag inflatable upwardly from the center console. The airbag includes an internal panel defining two chambers. The internal panel includes a plurality of tubes, and each tube includes an opening at which that tube terminates. The openings are proximate a top of the airbag and open to the chambers.

20 Claims, 5 Drawing Sheets

(56) References Cited

U.S. PATENT DOCUMENTS

| | | | |
|---|---|---|---|
| 8,414,018 B2 | 4/2013 | Choi et al. | |
| 8,480,123 B2 | 7/2013 | Choi et al. | |
| 9,592,788 B2 * | 3/2017 | Wiik | B60R 21/23138 |
| 10,266,145 B2 * | 4/2019 | Paxton | B60R 21/214 |
| 2008/0129024 A1 * | 6/2008 | Suzuki | B60R 21/23138 |
| | | | 280/734 |
| 2008/0203710 A1 * | 8/2008 | Kalliske | B60R 21/233 |
| | | | 280/729 |
| 2009/0001695 A1 * | 1/2009 | Suzuki | B60R 21/231 |
| | | | 280/730.2 |
| 2010/0140909 A1 * | 6/2010 | Jang | B60R 21/231 |
| | | | 280/743.1 |
| 2010/0283230 A1 * | 11/2010 | Tomitaka | B60R 21/231 |
| | | | 280/730.2 |
| 2010/0295280 A1 * | 11/2010 | Tomitaka | B60R 21/23138 |
| | | | 280/730.1 |
| 2011/0278826 A1 * | 11/2011 | Fukawatase | B60R 21/231 |
| | | | 280/730.2 |
| 2011/0309603 A1 * | 12/2011 | Choi | B60R 21/231 |
| | | | 280/729 |
| 2012/0119475 A1 * | 5/2012 | Choi | B60R 21/23138 |
| | | | 280/729 |
| 2013/0106080 A1 * | 5/2013 | Jarboe | B64D 11/06 |
| | | | 280/730.2 |
| 2015/0091278 A1 * | 4/2015 | Yasuoka | B60R 21/2334 |
| | | | 280/729 |
| 2015/0203065 A1 * | 7/2015 | Egusa | B60R 7/04 |
| | | | 280/730.2 |
| 2015/0298639 A1 * | 10/2015 | Mihm | B60N 2/90 |
| | | | 280/728.2 |
| 2017/0036636 A1 * | 2/2017 | Masuda | B60R 21/233 |
| 2018/0043853 A1 * | 2/2018 | Taguchi | B60R 21/20 |
| 2019/0023213 A1 * | 1/2019 | Faruque | B60R 21/231 |
| 2019/0152422 A1 * | 5/2019 | Deng | B60R 21/23138 |

FOREIGN PATENT DOCUMENTS

| | | | | |
|---|---|---|---|---|
| DE | 102018002853 A1 | * | 10/2018 | ............ B60R 7/04 |
| JP | 2008155904 A | * | 7/2008 | |
| JP | 2010052619 A | | 3/2010 | |
| JP | 2014076703 A | * | 5/2014 | |
| JP | 2014181014 A | * | 9/2014 | |

* cited by examiner

CENTER CONSOLE RESTRAINT SYSTEM

BACKGROUND

Vehicles are equipped with airbags. In the event of an impact, an inflator activates and provides inflation medium to the airbags, and the airbags pressurize and act as cushions for occupants during the impact. The airbags are located at various fixed positions in passenger cabins of vehicles. Vehicles typically include a driver airbag mounted in the steering wheel, a passenger airbag mounted in the dashboard in a vehicle-forward direction from the front passenger seat, and side air curtains mounted in the roof rails.

DETAILED DESCRIPTION

A restraint system includes a center console and an airbag inflatable upwardly from the center console. The airbag includes an internal panel defining two chambers. The internal panel includes a plurality of tubes, and each tube includes an opening at which that tube terminates. The openings are proximate a top of the airbag and open to the chambers.

The center console may define a forward direction, and the internal panel may extend along the forward direction from a front of the airbag to a rear of the airbag.

The plurality of tubes may include at least three tubes.

The tubes may be parallel to each other when the airbag is in an inflated position.

The internal panel may extend upwardly to a top edge proximate the top of the airbag when the airbag is in an inflated position. The openings of the tubes may be at the top edge of the internal panel.

The restraint system may further include an inflator fluidly connected to the tubes, and the chambers may be fluidly connected to the inflator only via the tubes.

The tubes may be spaced from each other. The internal panel may include at least one uninflatable region between the tubes. The center console may define a forward direction, the internal panel may include a front uninflatable region between a forwardmost tube of the tubes and a front of the airbag, and the internal panel may include a rear uninflatable region between a rearmost tube of the tubes and a rear of the airbag.

The internal panel may include two sheets sewn together parallel to each other, and the two sheets may define the tubes. The internal panel may include stitching sewing the two sheets together and defining the tubes.

The center console may define a forward direction, the sheets may be inner sheets, the airbag may include two outer sheets, and the two outer sheets and the two inner sheets may be sewn together along a front of the airbag and along a rear of the airbag. The two outer sheets and the two inner sheets may be sewn together along a bottom of the airbag.

The center console may include two hinged doors openable from a closed position, and the doors in the closed position may conceal the airbag in an uninflated position. The center console may include a seam between edges of the doors in the closed position. The seam may extend in a longitudinal direction relative to the center console.

The restraint system may further include two seats positioned laterally relative to the center console, and the doors may be openable to an open position in which each door contacts one of the seats.

The center console may include a lid, and the airbag in an uninflated position may be disposed in the lid. The center console may include a storage compartment, and the lid may be rotatable between a closed position covering the storage compartment and an open position revealing the storage compartment.

A restraint system 30 for a vehicle 32 includes a center console 34 and an airbag 36 inflatable upwardly from the center console 34. The airbag 36 includes an internal panel 38 defining two chambers 40. The internal panel 38 includes a plurality of tubes 42, and each tube 42 includes an opening 44 at which that tube 42 terminates. The openings 44 are proximate a top 46 of the airbag 36 and open to the chambers 40.

The restraint system 30 provides for quick deployment and protection of occupants during a side impact. Sending the inflation medium through the tubes 42 causes the airbag 36 to expand vertically more quickly, allowing the airbag 36 to be in the proper position for an impact. The position of the airbag 36 can protect occupants from impacting each other. Furthermore, the restraint system 30 provides for convenient packaging, with the airbag 36 stored in the center console 34 when uninflated.

Figure 1:
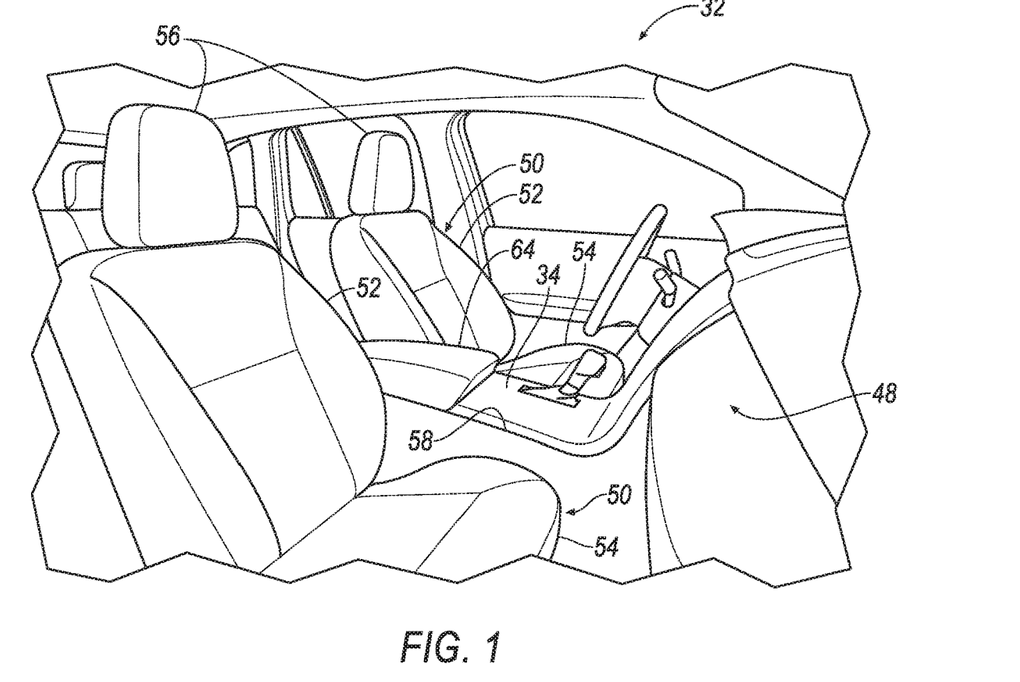
FIG. 1 is a perspective view of a portion of a passenger cabin of a vehicle including seats and a center console.

With reference to FIG. 1, the vehicle 32 includes a passenger cabin 48 to house occupants, if any, of the vehicle 32. The passenger cabin 48 includes one or more front seats 50 disposed at a front of the passenger cabin 48 and one or more back seats (not shown) disposed behind the front seats 50. The passenger cabin 48 may also include third-row seats (not shown) at a rear of the passenger cabin 48. Two front seats 50 may be positioned laterally relative to the center console 34, i.e., aligned in a cross-vehicle direction with the center console 34. In FIG. 1, the front seats 50 are shown to be bucket seats, but the front seats 50 may be other types. The position and orientation of the front seats 50 and components thereof may be adjustable by an occupant.

Each front seat 50 may include a seat back 52, a seat bottom 54, and a headrest 56. The headrest 56 may be supported by the seat back 52 and may be stationary or movable relative to the seat back 52. The seat back 52 may be supported by the seat bottom 54 and may be stationary or movable relative to the seat bottom 54. The seat back 52, the seat bottom 54, and/or the headrest 56 may be adjustable in multiple degrees of freedom. Specifically, the seat back 52, the seat bottom 54, and/or the headrest 56 may themselves be adjustable, in other words, adjustable components within the seat back 52, the seat bottom 54, and/or the headrest 56, and/or may be adjustable relative to each other.

The center console 34 is disposed between two front seats 50. The center console 34 is adjacent each of the front seats 50, i.e., nothing is disposed between each of the front seats 50 and the center console 34. The center console 34 defines a forward direction. The forward direction is the direction of forward travel of the vehicle 32. The front seats 50 face in the forward direction.

Figure 2:
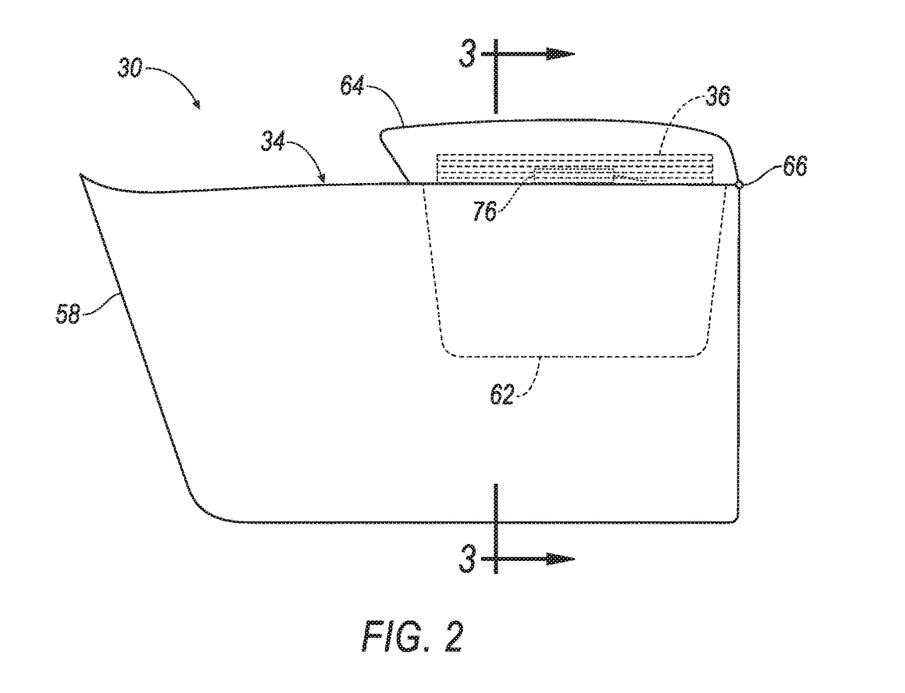
FIG. 2 is a side view of the center console.
Figure 3:
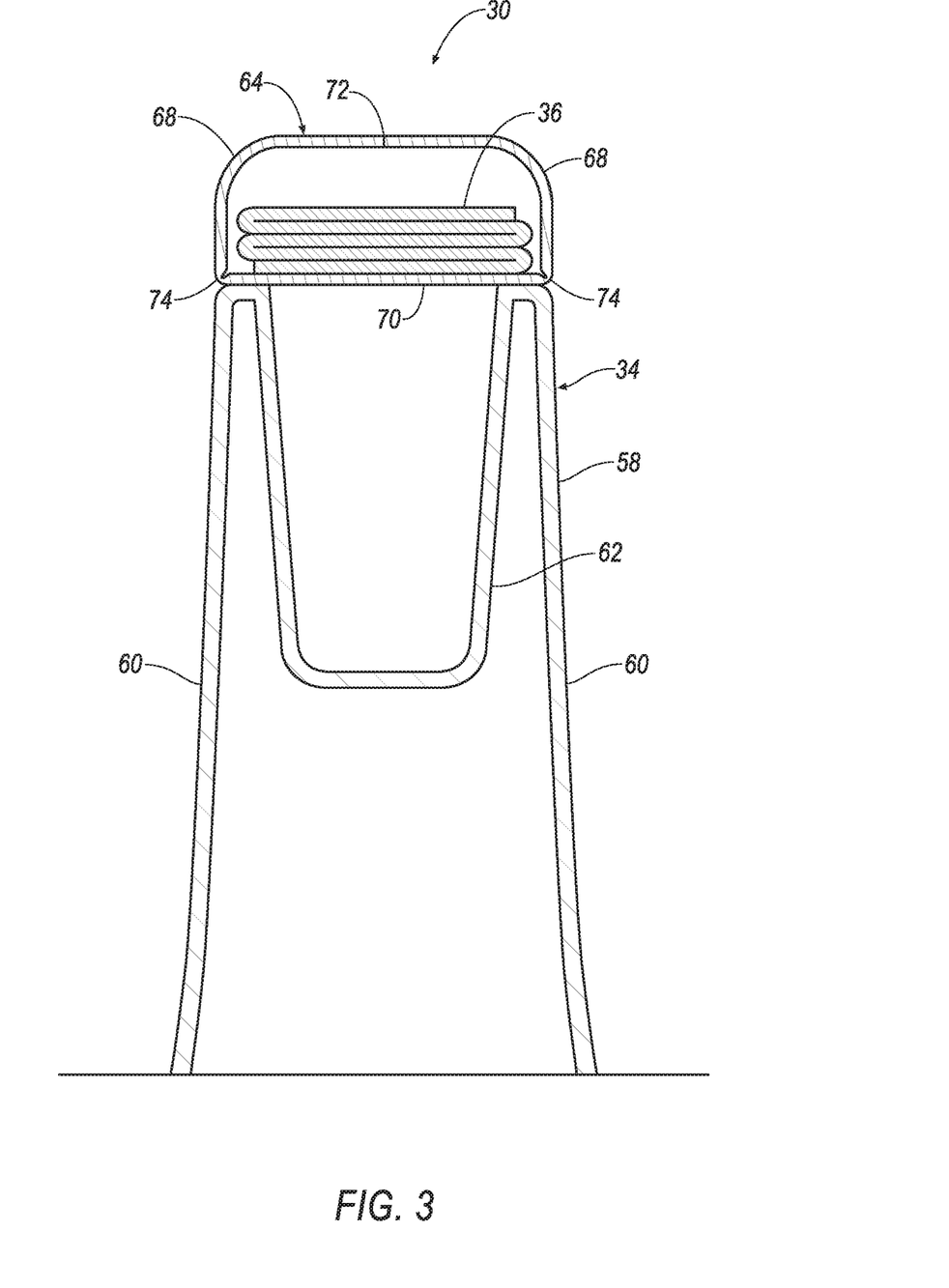
FIG. 3 is a front cross-sectional view of the center console with doors in a closed position.

With reference to FIGS. 2 and 3, the center console 34 may be formed of a rigid material, e.g., plastic. The center console 34 includes a fixed portion 58 that is fixed relative to the passenger cabin 48. The center console 34, specifically the fixed portion 58, may have sides 60 that face laterally, i.e., face in a cross-vehicle direction. The sides 60 are adjacent the front seats 50, and the front seats 50 may be spaced from or may abut the sides 60.

The center console 34 includes a storage compartment 62 and a lid 64. The storage compartment 62 is accessible to occupants for placing items inside. The storage compartment 62 may be disposed inside the fixed portion 58 and enclosed above by the lid 64. The lid 64 is rotatable between a closed position covering the storage compartment 62 and an open position revealing the storage compartment 62. The lid 64 may be rotatable about a lid hinge 66. The lid hinge 66 connects the lid 64 and the fixed portion 58. The lid hinge 66 may define an axis of rotation in a cross-vehicle direction. The lid 64 may rotate up and backwards about the axis of rotation from the closed position to the open position.

With reference to FIG. 3, the center console 34 includes two hinged doors 68 openable from a closed position. The doors 68 in the closed position conceal the airbag 36 in an uninflated position. The lid 64 includes the doors 68 and a bottom panel 70. The airbag 36 is supported by the bottom panel 70, and the airbag 36 is enclosed by the doors 68 and the bottom panel 70. The center console 34, specifically the lid 64, includes a seam 72 between edges of the doors 68 in the closed position. The seam 72 may be a detachment of the doors 68 from each other, or the seam 72 may link the doors 68 and be frangible from inflation of the airbag 36. The seam 72 may present a continuous surface to view by occupants.

Figure 4:
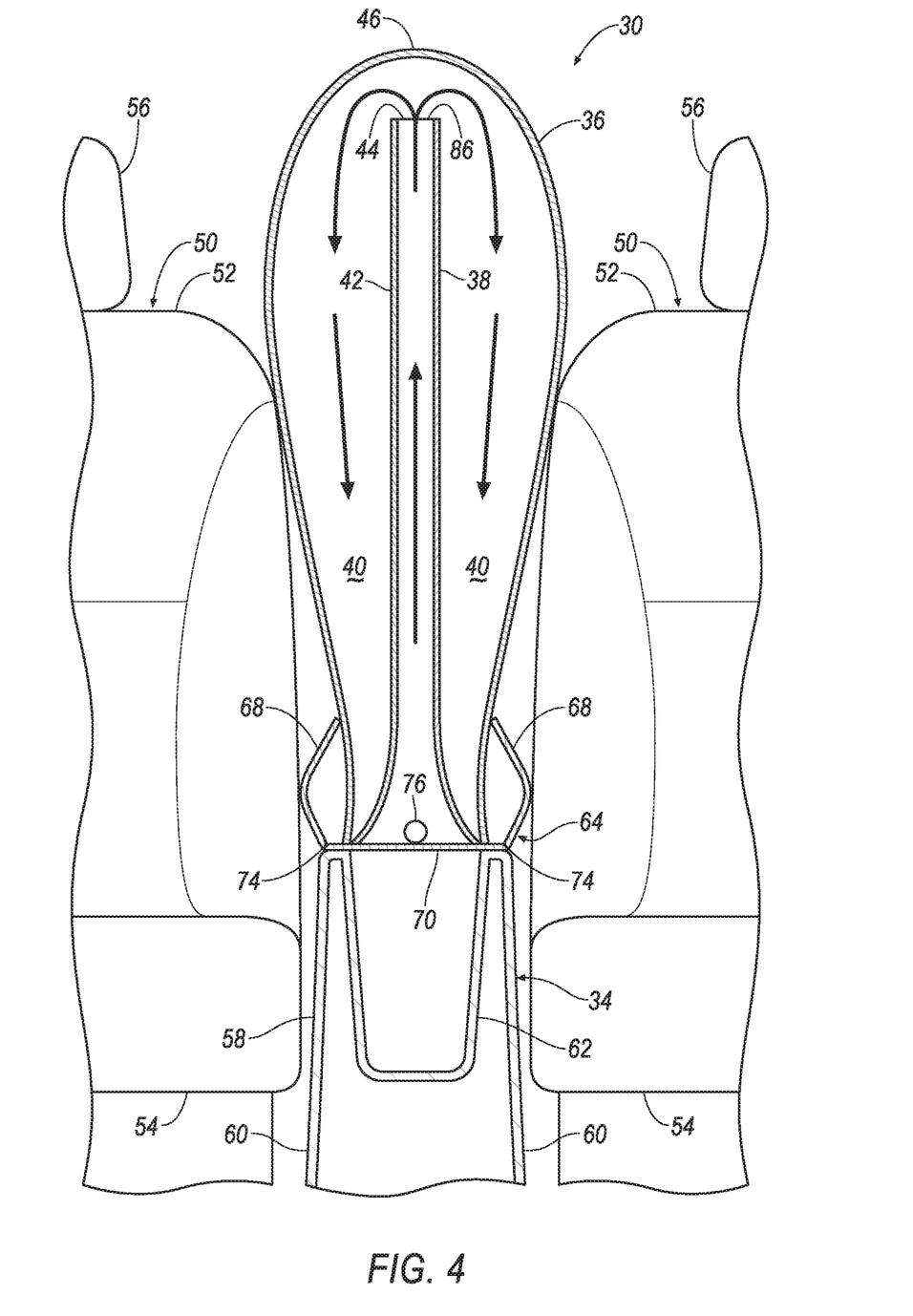
FIG. 4 is a front view of the center console with the doors in an open position and an airbag in an inflated position.

With reference to FIG. 4, the doors 68 are openable from the closed position to an open position in which each door 68 contacts one of the front seats 50. The doors 68 are rotated about door hinges 74. The door hinges 74 connect the doors 68 and the bottom panel 70. The door hinges 74 may define an axis of rotation extending in a vehicle-forward direction. Each door hinge 74 may have a first hinge portion fixed relative to the fixed portion 58, a second hinge portion fixed relative to the lid 64, and a pin connecting the first hinge portion and the second hinge portion. The pin may allow rotational motion of the second hinge portion relative to the first hinge portion. Alternatively, the door hinges 74 may be a comparatively thinner portion of the lid 64 that deforms in response to the force of the airbag 36 inflating.

An inflator 76 may be supported by the bottom panel 70 of the lid 64 and connected to the airbag 36. Upon receiving a signal from, e.g., a controller 78, the inflator 76 may inflate the airbag 36 with an inflatable medium, such as a gas. The inflator 76 may be, for example, a pyrotechnic inflator that uses a chemical reaction to drive inflation medium to the airbag 36. The inflator 76 may be of any suitable type, for example, a cold-gas inflator.

With reference to FIGS. 3 and 4, the airbag 36 is inflatable upwardly from the center console 34 from the uninflated position to an inflated position. The airbag 36 in the uninflated position is disposed in the lid 64. The airbag 36 in the inflated position extends directly between the seat backs 52 of the front seats 50 and directly between volumes that would be occupied by torsos of occupants of 50th-percentile stature sitting in the front seats 50.

Figure 5:
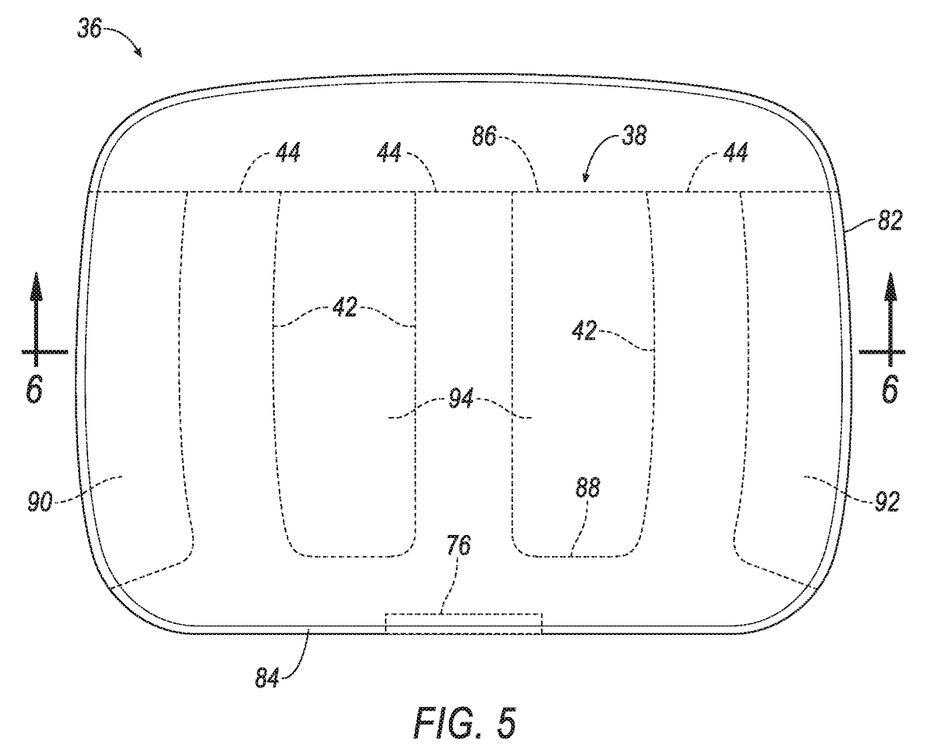
FIG. 5 is a side view of the airbag in the inflated position.
Figure 6:
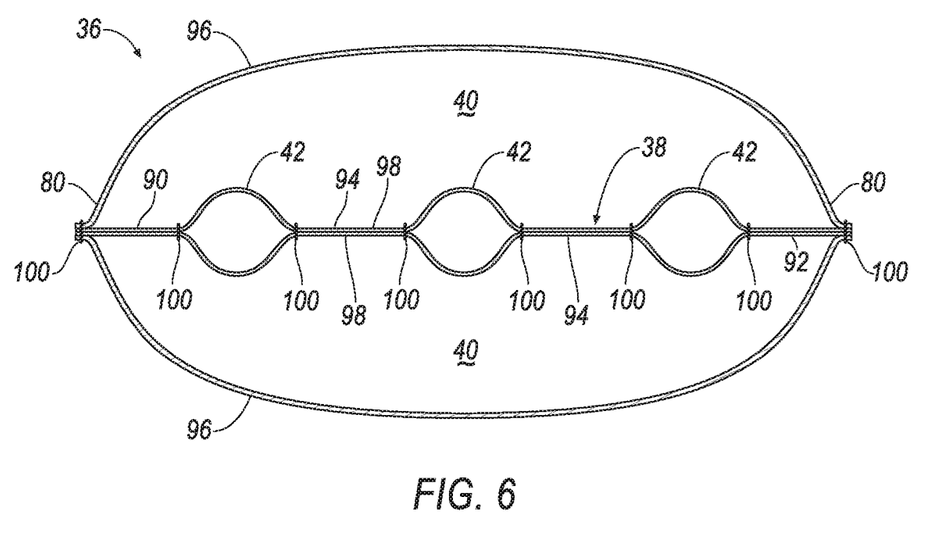
FIG. 6 is a top cross-sectional view of the airbag in the inflated position.

With reference to FIGS. 4-6, the airbag 36 in the inflated position extends from a front 80 to a rear 82 and from the top 46 to a bottom 84. The front 80 of the airbag 36 is the forwardmost portion of the airbag 36 relative to the center console 34; the rear 82 of the airbag 36 is the rearmost portion of the airbag 36 relative to the center console 34; the top 46 of the airbag 36 is the portion extending the farthest from the center console 34; and the bottom 84 of the airbag 36 is the portion closest to the center console 34. The airbag 36 in the inflated position may be longer in the forward direction than in the upward direction and longer in the forward direction than in the lateral direction. The airbag 36 in the inflated position may be longer in the upward direction than in the lateral direction.

The airbag 36 includes the internal panel 38. The internal panel 38 extends along the forward direction from the front 80 of the airbag 36 to the rear 82 of the airbag 36. The internal panel 38 extends from the bottom 84 of the airbag 36 to a top edge 86 proximate the top 46 of the airbag 36. The top edge 86 is spaced from the top 46 of the airbag 36. The internal panel 38 is internal to the airbag 36; in other words, the internal panel 38 extends through a volume enclosed by the airbag 36.

The internal panel 38 defines the two chambers 40; in other words, the internal panel 38 separates the volume inside the airbag 36 in the inflated position into the two chambers 40. The internal panel 38 extends between the chambers 40. The chambers 40 are fluidly connected only above the top edge 86 of the internal panel 38.

With reference to FIG. 5, the internal panel 38 includes a plurality of tubes 42, e.g., at least three tubes 42. When the airbag 36 is in the inflated position, the tubes 42 are elongated vertically and parallel to each other, and the tubes 42 are spaced from each other. The tubes 42 may be fluidly connected to each other near the bottom 84 of the airbag 36 via a connecting portion 88, and the inflator 76 may be fluidly connected to the tubes 42.

Each tube 42 is elongated from the connecting portion 88 adjacent the bottom 84 of the airbag 36 to the respective opening 44. The connecting portion 88 is positioned to receive inflation medium from the inflator 76. Each tube 42 terminates at the respective opening 44. The openings 44 are at the top edge 86 of the internal panel 38 and are proximate the top 46 of the airbag 36. The openings 44 are open to the chambers 40.

With reference to FIGS. 5 and 6, the internal panel 38 includes a plurality of uninflatable regions 90, 92, 94 between and connecting the tubes 42. The uninflatable regions 90, 92, 94 divide the chambers 40 from each other and do not inflate. The uninflatable regions 90, 92, 94 include a front uninflatable region 90 between a forwardmost of the tubes 42 and the front 80 of the airbag 36, a rear uninflatable region 92 between a rearmost of the tubes 42 and the rear 82 of the airbag 36, and one or more intermediate uninflatable regions 94 between respective tubes 42.

With reference to FIGS. 4-6, when the inflator 76 discharges, the inflation medium travels into the connecting portion 88, then upward through the tubes 42, then out the openings 44 proximate the top 46 of the airbag 36, and then downward to the chambers 40. The chambers 40 are fluidly connected to the inflator 76 only via the tubes 42; in other words, the path for inflation medium to enter the chambers 40 passes through the tubes 42.

With reference to FIG. 6, the airbag 36 includes two outer sheets 96, two inner sheets 98, and stitching 100 connecting the sheets 96, 98 together. The outer sheets 96 and inner sheets 98 are sewn together by the stitching 100 along the front 80, rear 82, and bottom 84 of the airbag 36. The outer sheets 96 are sewn together by the stitching 100 along the top 46 of the airbag 36, and the inner sheets 98 are spaced from the top 46 of the airbag 36. The two inner sheets 98 are sewn together by the stitching 100 parallel to each other to form the internal panel 38. The inner sheets 98 are sewn together to define the tubes 42. The stitching 100 extends along the tubes 42 and the connecting portion 88, and the stitching 100 divides the tubes 42 and the connecting portion 88 from the uninflatable regions 90, 92, 94.

The sheets 96, 98 of the airbag 36 may be formed of any suitable airbag material, for example, a woven polymer. For example, the sheets 96, 98 may be formed of woven nylon yarn, for example, nylon 6-6. Other suitable examples include polyether ether ketone (PEEK), polyetherketoneketone (PEKK), polyester, or any other suitable polymer. The woven polymer may include a coating, such as silicone, neoprene, urethane, and so on. For example, the coating may be polyorgano siloxane.

Figure 7:
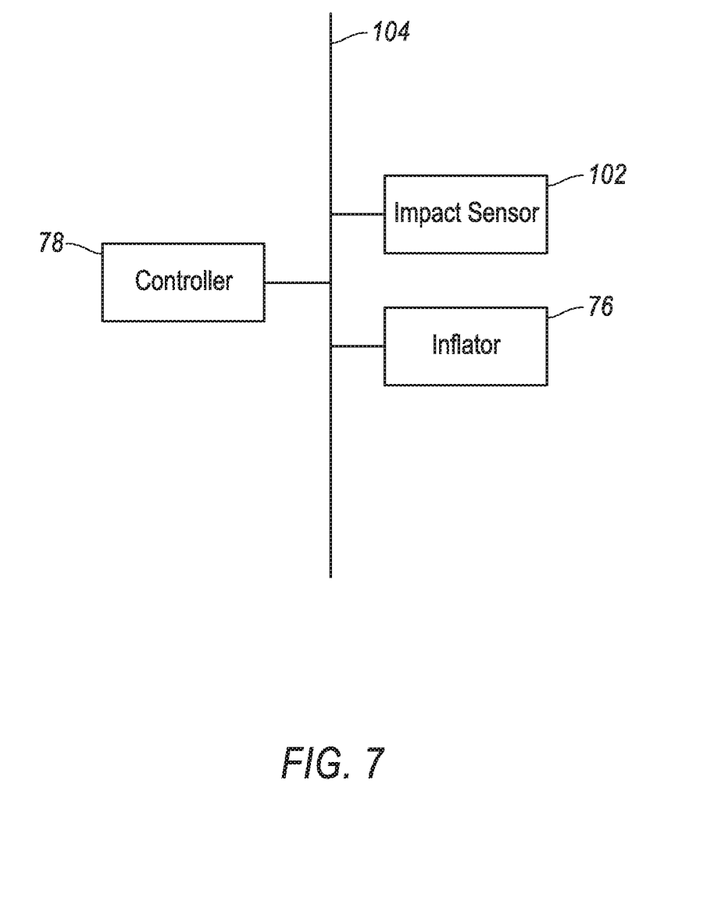
FIG. 7 is a block diagram of a control system for the airbag.

With reference to FIG. 7, an impact sensor 102 may be in communication with the controller 78. The impact sensor 102 is adapted to detect an impact to the vehicle 32. The impact sensor 102 may be of any suitable type, for example, post-contact sensors such as linear or angular accelerometers, gyroscopes, pressure sensors, and contact switches; and pre-impact sensors such as radar, lidar, and vision-sensing systems. The vision systems may include one or more cameras, CCD image sensors, CMOS image sensors, etc. The impact sensor 102 may be located at numerous points in or on the vehicle 32.

The controller 78 is a microprocessor-based controller. The controller 78 includes a processor, memory, etc. The memory of the controller 78 includes memory for storing instructions executable by the processor as well as for electronically storing data and/or databases. For example, the controller 78 may be a restraint control module that may control other airbags, pretensioners for seatbelts, etc.

The controller 78 may transmit and receive data through a communications network 104 such as a controller area network (CAN) bus, Ethernet, WiFi, Local Interconnect Network (LIN), onboard diagnostics connector (OBD-II), and/or by any other wired or wireless communications network. The controller 78 may be communicatively coupled to the inflator 76, the impact sensor 102, and other components via the communications network 104.

The controller 78 may be programmed to activate the inflator 76 in response to an impact to the vehicle 32. Activating the inflator 76 may be based on an angle of the impact. For example, the controller 78 may be programmed to activate the inflator 76 in response to a side impact and to maintain the airbag 36 in the uninflated position in response to a frontal impact or an oblique impact.

In the event of a side impact to the vehicle 32, the impact sensor 102 may detect the impact and transmit a signal through the communications network 104 to the controller 78. The controller 78 may transmit a signal through the communications network 104 to the inflator 76. The inflator 76 may discharge and send inflation medium into the connecting portion 88 of the airbag 36. The inflation medium travels through the connecting portion 88 and then through the tubes 42, which extends the airbag 36 vertically between occupants of the front seats 50. The vertical inflation of the airbag 36 pushes open the doors 68 against the seat backs 52 of the front seats 50. Because the combined cross-sectional area of the tubes 42 is less than the cross-sectional area of the airbag 36, as best seen in FIG. 6, less inflation medium is needed to vertically extend the airbag 36. Once the airbag 36 has extended vertically, the inflation medium fills in the chambers 40, expanding the airbag 36 laterally. The airbag 36 in the inflated position may cushion the occupants from impacting each other. The doors 68 are held in place from opening wider by the front seats 50, and the doors 68 may serve as reaction surfaces when an occupant is pushed against the airbag 36.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A restraint system comprising:
a center console; and
an airbag inflatable upwardly from the center console;
wherein the airbag includes an internal panel defining two chambers, the internal panel including a plurality of tubes, each tube including an opening at which that tube terminates, the openings proximate a top of the airbag and open to the chambers.

2. The restraint system of claim 1, wherein the center console defines a forward direction, and the internal panel extends along the forward direction from a front of the airbag to a rear of the airbag.

3. The restraint system of claim 1, wherein the plurality of tubes includes at least three tubes.

4. The restraint system of claim 1, wherein the tubes are parallel to each other when the airbag is in an inflated position.

5. The restraint system of claim 1, wherein the internal panel extends upwardly to a top edge proximate the top of the airbag when the airbag is in an inflated position.

6. The restraint system of claim 5, wherein the openings of the tubes are at the top edge of the internal panel.

7. The restraint system of claim 1, further comprising an inflator fluidly connected to the tubes, wherein the chambers are fluidly connected to the inflator only via the tubes.

8. The restraint system of claim 1, wherein the tubes are spaced from each other.

9. The restraint system of claim 8, wherein the internal panel includes at least one uninflatable region between the tubes.

10. The restraint system of claim 9, wherein the center console defines a forward direction, the internal panel includes a front uninflatable region between a forwardmost tube of the tubes and a front of the airbag, and the internal panel includes a rear uninflatable region between a rearmost tube of the tubes and a rear of the airbag.

11. The restraint system of claim 1, wherein the internal panel includes two sheets sewn together parallel to each other, and the two sheets define the tubes.

12. The restraint system of claim 11, wherein the internal panel includes stitching sewing the two sheets together and defining the tubes.

13. The restraint system of claim 11, wherein the center console defines a forward direction, the sheets are inner sheets, the airbag includes two outer sheets, and the two outer sheets and the two inner sheets are sewn together along a front of the airbag and along a rear of the airbag.

14. The restraint system of claim 13, wherein the two outer sheets and the two inner sheets are sewn together along a bottom of the airbag.

15. The restraint system of claim 1, wherein the center console includes two hinged doors openable from a closed position, and the doors in the closed position conceal the airbag in an uninflated position.

16. The restraint system of claim 15, wherein the center console includes a seam between edges of the doors in the closed position.

17. The restraint system of claim 16, wherein the seam extends in a longitudinal direction relative to the center console.

18. The restraint system of claim 15, further comprising two seats positioned laterally relative to the center console, wherein the doors are openable to an open position in which each door contacts one of the seats.

19. The restraint system of claim 1, wherein the center console includes a lid, and the airbag in an uninflated position is disposed in the lid.

20. The restraint system of claim 19, wherein the center console includes a storage compartment, and the lid is rotatable between a closed position covering the storage compartment and an open position revealing the storage compartment.

\* \* \* \* \*